(12) United States Patent
Bremner et al.

(10) Patent No.: US 8,792,513 B2
(45) Date of Patent: *Jul. 29, 2014

(54) WIRELESS SENSOR NETWORK INFORMATION SWARMING

(75) Inventors: Richard Bremner, Sydney (AU); Laurence Hey, Centennial Park (AU); William Izard, Sydney (AU); Matthew Ponsford, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,716

(22) Filed: Feb. 28, 2012

(65) Prior Publication Data

US 2012/0176959 A1    Jul. 12, 2012

Related U.S. Application Data

(62) Division of application No. 13/005,392, filed on Jan. 12, 2011, now Pat. No. 8,514,767.

(51) Int. Cl.
*G01R 31/08* (2006.01)
*H04W 4/00* (2009.01)
*H04L 12/54* (2013.01)
*H04J 3/00* (2006.01)

(52) U.S. Cl.
USPC ............ 370/428; 370/235; 370/338; 370/476

(58) Field of Classification Search
USPC ......... 370/230, 235, 252, 338, 401, 428, 474, 370/476; 709/223–224
See application file for complete search history.

(56) References Cited

U.S. PATENT DOCUMENTS

| 2005/0171662 | A1* | 8/2005 | Strege et al. ............ 701/33 |
| 2006/0187866 | A1* | 8/2006 | Werb et al. ............ 370/311 |
| 2007/0220141 | A1* | 9/2007 | Primm et al. .......... 709/224 |
| 2008/0002640 | A1  | 1/2008 | Westphal |
| 2008/0259919 | A1* | 10/2008 | Monga ................ 370/389 |
| 2009/0212918 | A1* | 8/2009 | Bandy et al. .......... 340/10.1 |
| 2010/0083035 | A1  | 4/2010 | Kim et al. |
| 2012/0092155 | A1* | 4/2012 | Abedi ................ 340/539.12 |

* cited by examiner

*Primary Examiner* — Redentor Pasia
(74) *Attorney, Agent, or Firm* — Steven M. Greenberg, Esq.; CRGO Law

(57) ABSTRACT

Embodiments of the present invention provide a method, system and computer program product for information swarming in a wireless sensor network (WSN). In an embodiment of the invention, a method for information swarming in a WSN can include receiving in an overhearing node of the WSN, relay data sensed by a sensor at an originating node of the WSN and transmitted along a relay path exclusive of the overhearing node from the originating node to an aggregation point in the WSN. The method also can include determining a relevance of the relay data in reference to at least one relevance rule. Finally, the method can include forwarding additional data acquired at the overhearing node by a sensor at the overhearing node to the aggregation point over the WSN in response to determining the relay data to be relevant.

6 Claims, 2 Drawing Sheets

WIRELESS SENSOR NETWORK INFORMATION SWARMING

CROSS-REFERENCE TO RELATED APPLICATIONS

This application is a Divisional of U.S. application Ser. No. 13/005,392, filed Jan. 12, 2011, currently pending, the entirety of which is incorporated herein by reference.

BACKGROUND OF THE INVENTION

1. Field of the Invention

The present invention relates to the field of remote sensing and more particularly to information processing in a wireless sensor network.

2. Description of the Related Art

Remote sensing refers to the acquisition of information of an object or phenomenon, by the use of either recording or real-time sensing device that is either wireless or not in physical or intimate contact with the object. In practice, remote sensing provides for the stand-off collection of data through the use of a variety of devices for gathering information on a given object or area. There are two main types of remote sensing: passive remote sensing and active remote sensing. In passive remote sensing, passive sensors detect natural radiation emitted or reflected by the target object or surrounding area. Active remote sensing, by comparison, utilizes active sensors that emit energy in order to scan objects and areas whereupon the sensors then detect and measure the reflected or backscattered radiation from the target.

A wireless sensor network (WSN) is a physical embodiment of a remote sensing system. A WSN primarily includes a selection of spatially distributed autonomous sensors cooperatively monitoring physical or environmental conditions, such as temperature, sound, vibration, pressure, motion or pollutants. In addition to one or more sensors, each node in a WSN is typically equipped with a radio transceiver or other wireless communications device, a microcontroller, and a power source, usually a battery. Of note, a WSN normally constitutes a wireless ad-hoc network, meaning that each sensor supports a multi-hop routing algorithm where nodes function as forwarders, relaying data packets to a base station.

To the extent that each node in a WSN can act as a transmission relay for other nodes transmitting data to a base station or other aggregation point for collected data, those nodes acting as a transmission relay can access the content of the data routed from acquiring node to aggregation point. Further, different nodes outside of the path of relay for data, but within transmission proximity to nodes in the path of relay can detect the data as the data traverses the path of relay. However, at present no additional processing is performed on data overheard in a proximate node within a path of relay from point of origin to aggregation point. Depending upon the remote sensing application, however, data overheard by nodes outside the path of relay to the aggregation point could provide additional context for relayed data. In this regard, in many cases, data overheard by nodes could be useful in enhancing the meaning of relayed data.

BRIEF SUMMARY OF THE INVENTION

Embodiments of the present invention address deficiencies of the art in respect to the collection of data in a WSN and provide a novel and non-obvious method, system and computer program product for information swarming in a WSN. In an embodiment of the invention, a method for information swarming in a WSN can include receiving in an overhearing node of the WSN, relay data sensed by a sensor at an originating node of the WSN in a relay path exclusive of the overhearing node en route to an aggregation point in the WSN. The method also can include determining a relevance of the relay data in reference to at least one relevance rule. Finally, the method can include forwarding additional data acquired at the overhearing node by a sensor at the overhearing node to the aggregation point over the WSN in response to determining the relay data to be relevant.

In another embodiment of the invention, a WSN data processing system node can be configured for information swarming. The system node can include a host computing device including at least one processor and memory and communicatively coupled to different nodes in the WSN and an aggregation point receiving data collected by the nodes in the WSN. The system also can include a data acquisition module coupled to a sensor and executing in the computing device and acquiring data sensed by the sensor. The system yet further can include a data overhearing module also executing in the computing device and overhearing relay data from nodes in a relay path exclusive of the WSN data processing system node for relay to the aggregation point. Finally, the system can include a swarming module coupled to both the data acquisition module and the data overhearing module and executing in the computing device.

The swarming module can include program code configured to determine a relevance of relay data overheard by the overhearing module in the relay path in reference to at least one relevance rule, and to forward additional data acquired by the data acquisition module to the aggregation point over the WSN in response to determining the relay data to be relevant. For example, the relevance rule can specify the relay data to be relevant if a value of the relay data crosses a threshold value, if a trend of values of the relay data overheard by the WSN data processing system node crosses a threshold value, if a quantifiable relationship between the WSN data processing system node and the originating node crosses a threshold value, or if a value of the data acquired at the WSN data processing system node crosses a threshold value, to name only a few examples.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for information swarming in a WSN. In accordance with an embodiment of the invention, a node outside a path of relay of data en route to an aggregation point in the WSN can sense the data in the path of relay to the aggregation point. The data can be inspected and compared to one or more swarming rules. Thereafter, if called for by one or more of the swarming rules, additional data collected by the node can be forwarded to the aggregation point. In this way, the sensed data overheard in the course of relay to the aggregation point can be enhanced with additional data pertinent to the inspected data. When compounded across a number of nodes in the WSN, a clearer and more accurate picture of the relevancy of sensed data will be apparent to one reducing the aggregated data at the aggregation point.

Figure 1:
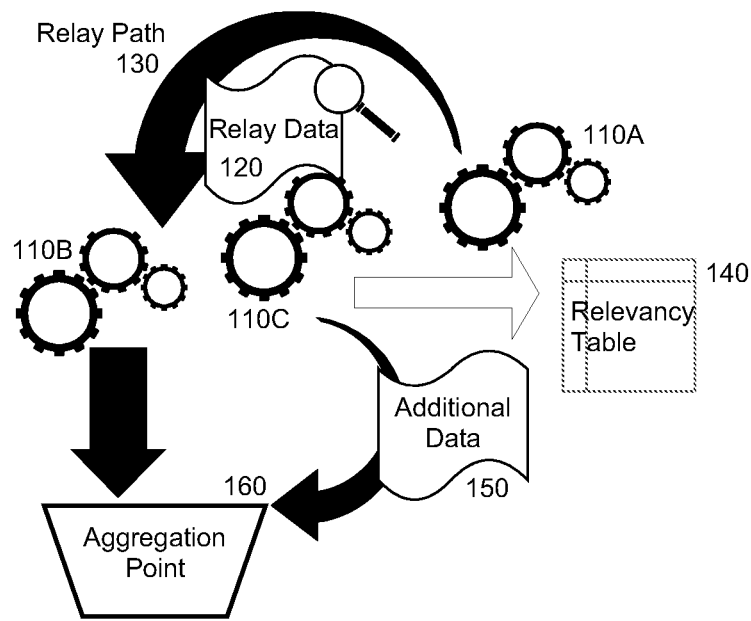
FIG. 1 is a pictorial illustration of a process for information swarming in a WSN.

In further illustration, FIG. 1 pictorially shows a process for information swarming in a WSN. As shown in FIG. 1, different nodes 110A, 110B, 110C (only three nodes shown for the sake of illustrative simplicity) can be arranged in a WSN to sense and collect data and to forward the same to an aggregation point 160 for data reduction. Each of the nodes 110A, 110B, 110C can act as a relay for data received from others of the nodes 110A, 110B, 110C to the aggregation point 160. Upon overhearing relay data 120 transmitted from one node 110A to another node 110B along a relay path 130, overhearing node 110C outside of the relay path 130 can inspect the nature of the relay data 120 and the nature of the relay data 120 can be located in a relevancy table of rules 140 to determine the relevance of the relay data 120. To the extent the relay data 120 is deemed relevant to the node 110C overhearing the relay data 120 for relay to the aggregation point 160 along the relay path 130, additional data 150 ancillary to the relay data 120 can be stored at the node 110C before overhearing the relay data 120 and also collected by the node 110C after overhearing the relay data 120. Thereafter, the additional data 150 can be forwarded to the aggregation point 160 from the node 110C. To the extent that multiple different nodes in a WSN overhearing data and applying relevancy rules to the overheard data provide ancillary data, a swarming of ancillary data pertinent to the overheard data can be provided to the aggregation point 160.

Figure 2:
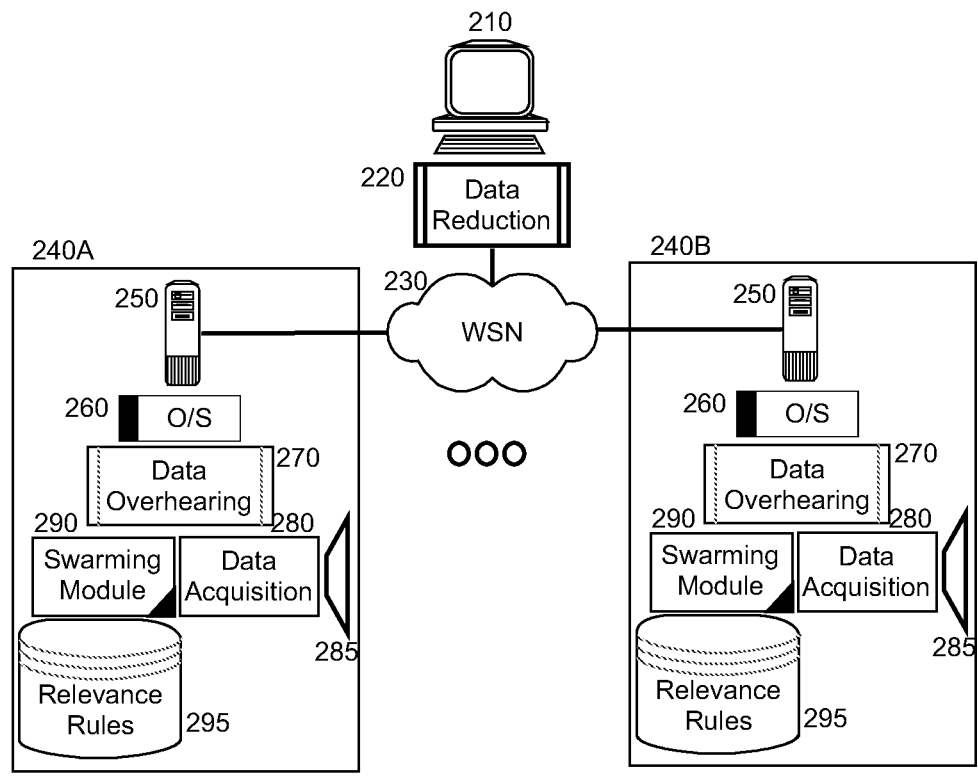
FIG. 2 is a schematic illustration of a WSN data processing system configured for information swarming; and, FIG. 3 is a flow chart illustrating a process for information swarming in a WSN.

The process described in connection with FIG. 1 can be implemented within a WSN. In yet further illustration, FIG. 2 schematically shows a WSN data processing system configured for information swarming. The system can include different nodes 240A, 240B communicatively coupled to a host computer 210 in a WSN 230 providing a data aggregation point for aggregating data relayed from the nodes 240A, 240B. Each node 240A, 240B can include a host computing device 250 providing at least one processor and memory in which computer programs execute within the node 240A, 240B. The host computing device 250 can support the execution of an operating system 260 hosting the execution of a number of computer program modules including a data overhearing module 270, a data acquisition module 280 and a swarming module 290.

In this regard, the data overhearing module 270 of one of the overhearing nodes 240A, 240B can include program code enabled when executing in the host computing device 250 to overhear relay data from others of the nodes 240A, 240B for routing along a relay path exclusive of the overhearing one of the nodes 240A, 240B to the data aggregation point provided in the host computer 210 and for reduction by companion data reduction module 220 executing in the host computer 210. The data acquisition module 280 can include program code enabled to receive data transduced from sensor 285 and to forward the received data to the data aggregation point provided in the host computer 210 for reduction by companion data reduction module 220. Of note, in forwarding the received data transduced from the sensor 285, the data overhearing module 270 of others of the nodes 240A, 240B can supplement overheard data to the data aggregation point over the WSN.

Of note, the swarming module 290 can include program code enabled when executing in the host computing device 250 to determine a relevance of relay data overheard in transit in a relay path from others of the nodes 240A, 240B to the aggregation point over the WSN. More particularly, the relay data when overheard in the data overhearing module 270 can be subjected to one or more relevance rules 295 to determine a degree of relevance of the relay data. The relevance rules, for example, can determine a degree of relevance based upon a value of the relay data, a trend in values for relay data of a particular type, a relationship between an originating one of the nodes 240A, 240B and the overhearing one of the nodes 240A, 240B in which the relevance determination is to be made, or the value of other sensed data that relates to the relay data.

For example, a relevance rule pertaining to the value of relay data describing a temperature can determine relevance for a temperature that exceeds a threshold value. As another example, a relevance rule pertaining to a trend in values of relay data describing a temperature can determine relevance when a series of temperature readings originating from a particular one of the nodes 240A, 240B exceeds a threshold rate. As yet another example, a relevance rule pertaining to a relationship between an originating one of the nodes 240A, 240B and the overhearing one of the nodes 240A, 240B in which the relevance determination is to be made can determine relevance when a distance between the nodes 240A, 240B is within a threshold value. As even yet another example, a relevance rule pertaining to the value of other sensed data that relates to the relay data can include a determination of relevance when a wind velocity measured at the overhearing one of the nodes 240A, 240B exceeds a threshold value while the relay data of temperature measured at the originating one of the nodes 240A, 240B is at a particular value.

In any case, the program code of the swarming module 290 can be further enabled to process overheard relay data determined to be relevant by forwarding additional data acquired by data acquisition module 280 to the aggregation point over the WSN to supplement the relay data. For example, for temperature data relayed by an originating one of the nodes 240A, 240B to the aggregation point that when overheard exceeds a threshold value, temperature data acquired by the overhearing one of the nodes 240A, 240B can be forwarded to the aggregation point in order to provide a more comprehensive view of temperature readings in the WSN and to provide a context for the threshold temperature reading at the originating one of the nodes 240A, 240B.

Figure 3:
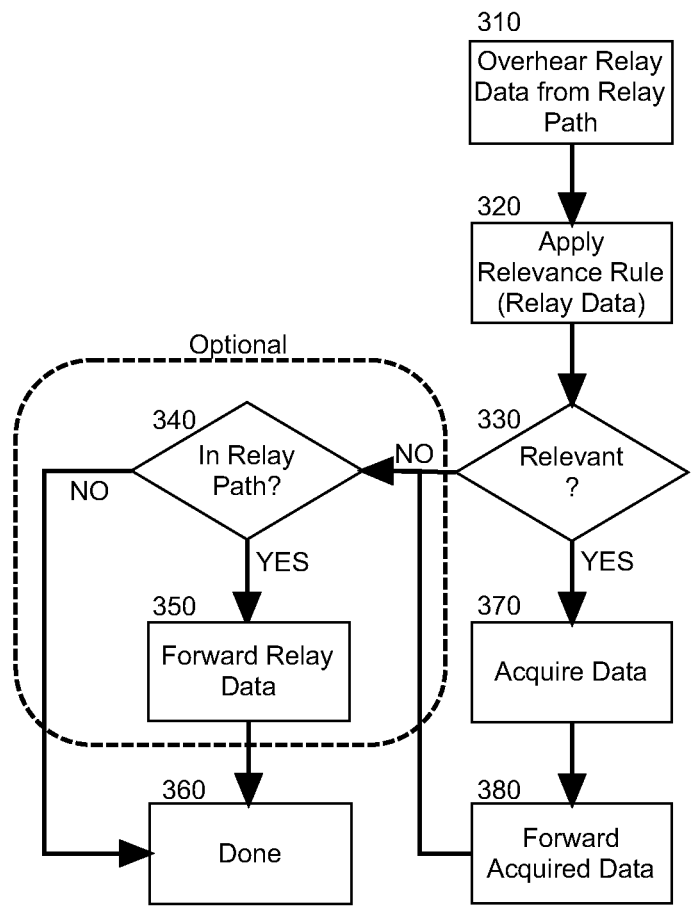

In even yet further illustration of the operation of the swarming module 290, FIG. 3 is a flow chart illustrating a process for information swarming in a WSN. Beginning in block 310, in an overhearing node, relay data can be overheard in a relay path from an originating node in the WSN to an aggregation point in the WSN. In block 320, a relevance rule can be applied to the relay data. For example, the relevance rule can account for the value of the relay data exceeding or falling below or equating to a particular value, the relevance rule can account for a trend in values of the relay data for data of a particular type, the relevance rule can account for a rate of change in values of the relay data for data of a particular type, the relevance rule can account for a relationship between the overhearing node and the originating node, or the relevance rule can account for a value of data exceeding, meeting or falling below a specified value when the data has been acquired in the overhearing node.

In decision block 330, it can be determined whether or not the relay data is determined to be relevant based upon the application of a single relevance rule, or the application of multiple relevance rules to the overheard relay data and data already acquired at the overhearing node. If not, in block 340 as an option it further can be determined whether or not the overhearing node is within the relay path of the relay data from the originating node to the aggregation point. If so, in block 350 the relay data can be forwarded on to the aggregation point and the process can end in block 360. However, if the relay data has been determined to be relevant in decision block 330, in block 370 additional data can be acquired in the overhearing node in supplement to the relay data and previously acquired data. Thereafter, the newly or additionally acquired data can be forwarded on to the aggregation point in block 380 and, again as an option, if determined in decision block 340 that the overhearing node is within the relay path, in block 350 the relay data also can be forwarded on to the aggregation point and the process can end in block 360. In this way, a more comprehensive view of sensed readings in the WSN can be provided along with better context for the reading acquired at the originating node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for information swarming in a wireless sensor network (WSN) comprising:

receiving relay data in an overhearing node of the WSN that is positioned proximate to a relay path defined exclusive of the overhearing node between an originating node in the WSN of the relay data and an aggregation point of the WSN, the relay data being sensed by a sensor at the originating node of the WSN en route from the originating node along the relay path exclusive of the overhearing node to the aggregation point of the WSN;

determining whether the relay data is relevant to the overhearing node in reference to at least one relevance rule; and, forwarding additional data acquired at the overhearing node by the sensor at the overhearing node to the aggregation point over the WSN in response to determining the relay data to be relevant.

2. The method of claim 1, wherein determining the relevance of the relay data in reference to at least one relevance rule, comprises determining the relevance of the relay data in reference to at least one relevance rule specifying the relay data to be relevant if a value of the relay data crosses a threshold value.

3. The method of claim 1, wherein determining the relevance of the relay data in reference to at least one relevance rule, comprises determining the relevance of the relay data in reference to at least one relevance rule specifying the relay data to be relevant if a trend of values of relay data overheard by the overhearing node crosses a threshold value.

4. The method of claim 1, wherein determining the relevance of the relay data in reference to at least one relevance rule, comprises determining the relevance of the relay data in reference to at least one relevance rule specifying the relay data to be relevant if a quantifiable relationship between the overhearing node and the originating node crosses a threshold value.

5. The method of claim 1, wherein determining the relevance of the relay data in reference to at least one relevance rule, comprises determining the relevance of the relay data in reference to at least one relevance rule specifying the relay data to be relevant if a value of the data acquired at the overhearing node crosses a threshold value.

6. The method of claim 1, wherein determining the relevance of the relay data in reference to at least one relevance rule, comprises determining the relevance of the relay data in reference to at least one relevance rule specifying the relay data to be relevant if a quantifiable relationship between the data acquired at the overhearing node and the overheard relay data crosses a threshold value.

* * * * *